Dec. 7, 1937.  F. REICH  2,101,478
ADJUSTABLE TEMPLET
Filed March 20, 1936  2 Sheets-Sheet 1
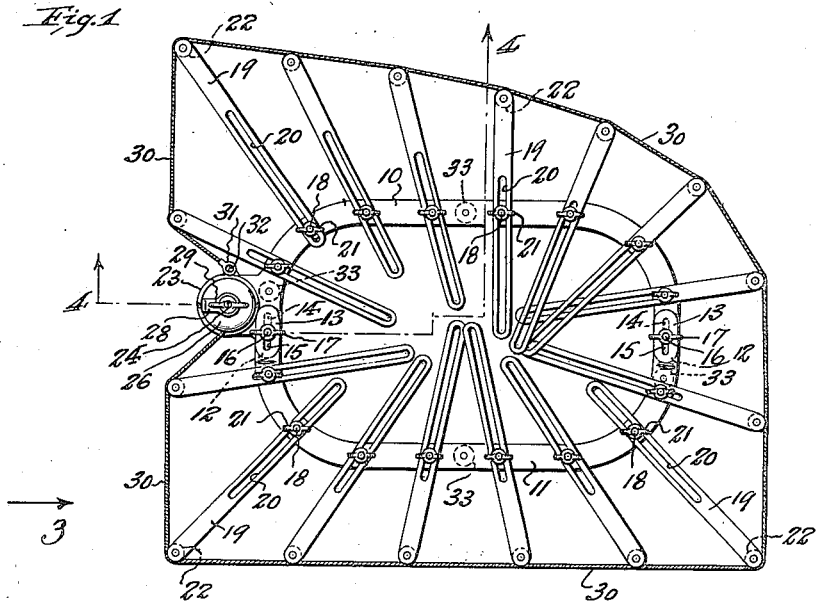
INVENTOR.
Frederick Reich
BY
George D. Richards
ATTORNEY.

Dec. 7, 1937.　　　F. REICH　　　2,101,478
ADJUSTABLE TEMPLET
Filed March 20, 1936　　　2 Sheets-Sheet 2
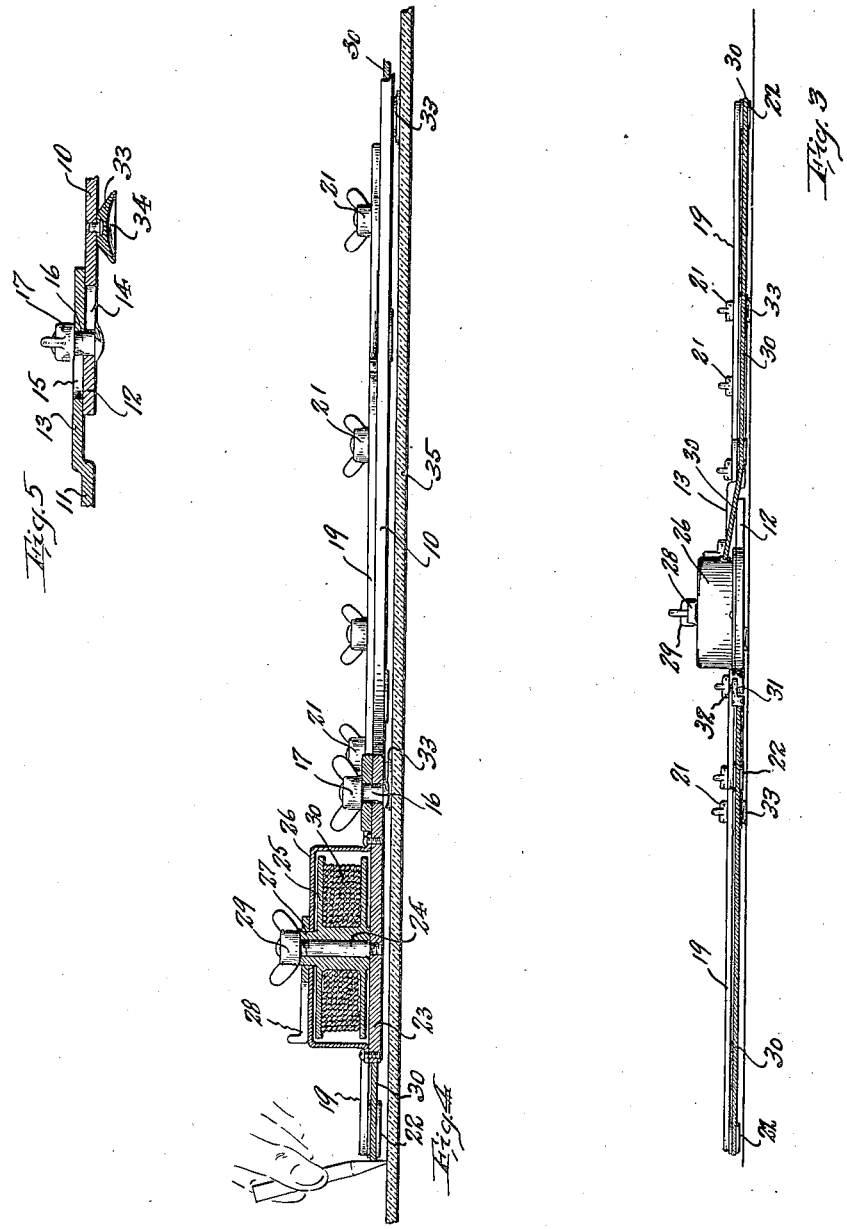
INVENTOR.
Frederick Reich
BY George D. Richards
ATTORNEY.

Patented Dec. 7, 1937

2,101,478

UNITED STATES PATENT OFFICE 2,101,478

ADJUSTABLE TEMPLET

Frederick Reich, Elizabeth, N. J.

Application March 20, 1936, Serial No. 69,794

10 Claims. (Cl. 33—176)

This invention relates, generally, to an improved adjustable templet device for ascertaining the outline of apertures and bodies having irregular peripheries, such e. g. as automobile window and wind shield frames and glass replacements therefor.

This invention has for its principal object to provide a novel construction of adjustable templet device, comprising a supporting frame having a series of extensibly and angularly adjustable caliper bars to radiate therefrom, all so arranged that irregularly shaped window-frames or other apertures, the peripheral shape of which are desired to be ascertained, may be determined by applying the device to a given aperture and thereupon manipulating the caliper bars to engage and fit the aperture periphery; said frame being constructed to permit partial collapse or contraction thereof to facilitate removal of the device from the measured aperture, whereupon, after such removal, the frame may be again expanded to normal condition so that the caliper bar extremities define the peripheral shape of the measured aperture.

The invention has for a further object to provide in a templet device of the kind above mentioned, additional means cooperative with the free ends of said caliper bars to provide a scribing guide around the periphery defined by said bar extremities, so that glass or other material may be scribed by aid of the templet device, and then cut along the scribed line with assurance that it will fit the measured aperture.

Another object of the invention is to provide the templet device with a novel arrangement of suction means for adhering the same to glass or other material preparatory to scribing the latter.

Other objects of this invention, not at this time more particularly enumerated, will be understood from the following detailed description of the same.

Illustrative embodiments of this invention are shown in the accompanying drawings, in which:—

Fig. 1 is a plan or face view of one form of the novel adjustable templet device according to this invention; Fig. 2 is a similar view showing a modified form thereof; Fig. 3 is an edge elevation of the templet device, as shown in Fig. 1, viewed in the direction of the arrow 3, but drawn on an enlarged scale; Fig. 4 is a fragmentary longitudinal sectional view of the device, taken on line 4—4 in Fig. 1 and drawn on a further enlarged scale; and Fig. 5 is a fragmentary sectional view, taken on line 5—5 in Fig. 2, and drawn on an enlarged scale.

Similar characters of reference are employed in the above-described views, to indicate corresponding parts.

Referring to the drawings, the templet device comprises a main frame composed of at least two complementary sections 10 and 11, preferably in the form of more or less flat curvilinear bodies; the free end portions 12 of one section being opposed to and overlapped with the free end portions 13 of the other section, thus making up an open frame member, the geometrical shape of which may be variously designed. Formed in the end portions 12 of one frame section are elongated slots 14, and, in like manner, the end portions 13 of the other section are also provided with elongated slots 15. The slots of one section register with those of the other section, and engaged therethrough are lock-bolts 16 having wing nuts 17 engaged thereon which, when tightened, interlock the frame sections against relative movement. Preferably the end portions of one frame section, as 11 for example, are offset as shown in Fig. 5 so that when the same are overlapped on the end portions of the other frame section 10, the two frame sections will lie in a single plane.

Affixed to the frame sections 10 and 11, at spaced intervals around the extent thereof, are upwardly projecting threaded studs 18. Arranged upon said frame sections, to radiate therefrom, are a plurality of caliper bars 19. The inner end portions of said caliper bars are provided with longitudinal slots 20 which are engaged over the studs 18, whereupon wing-nuts 21 may be turned down on the studs so as to clamp and hold the caliper bars 19 in any extended and angular disposition to which they may be individually moved or adjusted. Mounted on the free end portion, and preferably on the underside of each caliper bar 19, in aligned or registered relation to the extremity thereof is a peripherally grooved guide piece 22. These guide pieces may be either in the form of rollers or fixed blocks.

One of said frame sections, as 10 for example, is provided with a suitably disposed bracket plate 23 extending in the plane thereof. Affixed to said bracket plate 23 is an upstanding bearing post 24 having a screw-threaded extremity. Journaled for rotation upon said bearing post is a spool or reel 25. Said spool or reel 25 is suitably enclosed by a casing 26 which is suitably secured to said bracket plate. Spool or reel 25 is provided with a hub extension 27 which projects exteriorly of said casing 26, and affixed to said hub extension is a hand crank 28 for turning said spool or reel. Threaded upon the exterior end of said bearing post 24 is a wing nut 29 which, when tightened against the end of said hub extension 27, may be caused to bind or clamp said spool or reel 25 against rotary movement. Wound upon said spool or reel 25 is a line or cable 30, the free or outer extremity of which extends through the wall of said casing and exteriorly of the latter. Said extremity of said line or cable 30 has affixed thereto a pull and anchoring ring 31, which may at proper times be engaged or hooked over an anchor stud 32, for purposes to be hereafter explained.

Affixed to the underside of the frame sections 10 and 11, in suitably spaced apart relation, are a plurality of soft rubber suction cups 33 having concave bottom suction faces 34.

To illustrate the manner in which the above described adjustable templet device is used, let it be assumed that it is desired to determine, by the use thereof, the peripheral shape of an automobile window frame aperture to obtain a pattern for scribing and then cutting a glass replacement therefor. In such case, the frame sections 10 and 11 are expanded by relative outward movement thereof to the limits of outer ends of the slots 14—15 of their lapped end portions; the sections being thereupon locked in said extended or expanded condition by tightening down the wing-nuts 17. When the main frame is thus expanded it is applied within the window frame aperture to be measured, whereupon the caliper bars 19 are extended and angularly adjusted to contact their outer extremities in spaced apart relation with and about the aperture limits of the window-frame, and as so adjusted are locked against displacement from adjusted positions by tightening into clamping or binding relation thereto the wing nuts 21. The extremities of said caliper bars will now describe or define the peripheral shape of the window-frame aperture. To facilitate removal of the thus adjusted templet device from engaged relation to the window frame opening, the wing-nuts 17 are relaxed so as to permit the frame sections to be partially collapsed or contracted by relative inward movement thereof to the limits of the inner ends of slots 14—15 of their lapped end portions. Such contraction of the main frame will withdraw or free the extremities of the adjusted caliper bars from engagement with one side (e. g. the upper side) of the window-frame aperture, thus allowing the device to be tipped outwardly at such point and then slid upwardly and away from the window-frame. The templet device having been withdrawn from the window-frame, the frame sections are again expanded and locked, thus returning the caliper bars of the same to the measured peripheral contour positions corresponding to the peripheral shape of the window-frame aperture. This having been done, the reel or spool 25 is freed for rotation, whereupon the line or cable 30 is pulled off therefrom and carried over the guide pieces 22 successively from one caliper bar to another until its end reaches back to the reel or spool casing 26, whereupon the pull ring 31 is engaged over the anchor stud 32. Any slack in the line or cable 30 is taken up by winding up the spool or reel 25 until the line or cable 30 is tautly extended around the templet device, whereupon the reel or spool is locked against reverse rotation by tightening the wing nut 29, and consequently the line is held taut and true ready to serve as a scribing guide. The templet device is now ready for application to the glass sheet to be scribed and then cut. The templet device is applied bottom down upon the glass sheet 35 (see Fig. 4), and the suction cups 33 are pressed into adhering relation thereto, thereby holding the templet device against accidental displacement during the scribing operation. It will be obvious that the user may now guide a marking pencil or scriber against the stretched cable or line 30, and by following the latter around the templet device, will accomplish the scribing of the glass to a peripheral shape corresponding to and adapted to fit the measured window frame aperture.

In Fig. 2 I have shown a somewhat modified form of the novel adjustable templet device, wherein the caliper bars 19 are provided with one or more extensibly and angularly adjustable auxiliary caliper bars 36. Said auxiliary caliper bars 36 are provided with longitudinal slots 37 along their inner end portions to engage over threaded studs 38 carried by said main caliper bars 19. It will be obvious from an inspection of Fig. 2, that said auxiliary caliper bars 36 may be angularly and extensibly adjusted to branch from said main caliper bars 19 with additional calipering effect, and when adjusted may be locked or fixed by the clamping wing-nuts 39. The extremities of said auxiliary caliper bars 36 are provided with line or cable guide pieces 40, similar to the guide pieces 22 of the main caliper bars 19.

I am aware that many changes could be made in the above described constructions and many apparently widely different embodiments of this invention could be made without departing from the scope thereof as defined in the following claims. It is therefore intended that all matter contained in the above description or shown in the accompanying drawings shall be interperted as illustrative and not in a limiting sense.

I claim:—

1. An adjustable templet, comprising a frame, a plurality of extensibly and angularly adjustable caliper bars radially extending from said frame, means to clamp said caliper bars in adjusted positions, the outer extremities of said caliper bars having guide means, a removable and extensible scribing guide cable to extend over said guide means and around the templet device.

2. An adjustable templet, comprising a frame, a plurality of extensibly and angularly adjustable caliper bars radially extending from said frame, means to clamp said caliper bars in adjusted positions, the outer extremities of said caliper bars having guide means, a scribing guide cable to extend over said guide means and around the templet device, a rotative cable reel carried by said frame, means to lock said cable reel against rotation, and the free end of said cable and said frame having cooperative means for anchoring the cable in extended condition.

3. An adjustable templet, comprising a central main frame composed of cooperative sections, means connecting said frame sections for relative extensive and contractive movements, means for locking said frame sections in extended relation, a plurality of extensibly and angularly adjustable caliper bars radially extending from said frame, means to clamp said caliper bars in adjusted positions, the outer ends of said caliper bars having guide means, and a removable and extensible scribing guide cable to extend over said guide means and around the templet device.

4. An adjustable templet, comprising a frame composed of cooperative sections, means connecting said frame sections for relative extensive and contractive movements, means for locking said frame sections in extended relation, a plurality of extensibly and angularly adjustable caliper bars radially extending from said frame, means to clamp said caliper bars in adjusted positions, the outer ends of said caliper bars having guide means, a scribing guide cable to extend over said guide means and around the templet device, a rotative cable reel carried by said frame, means to lock said cable reel against rotation, and the free end of said cable and said frame having cooperative means for anchoring the cable in extended condition.

5. An adjustable templet, comprising a central frame, a plurality of main caliper bars radially extending from said frame subject to extensible and angular adjustment, means to clamp said main caliper bars to said frame in adjusted positions, auxiliary caliper bars carried by and solely connected with the outer end portions of said main caliper bars subject to extensible and angular adjustment in relation thereto, and means for clamping said auxiliary caliper bars in adjusted positions.

6. An adjustable templet, comprising a central frame, a plurality of main caliper bars radially extending from said frame subject to extensible and angular adjustment, means to clamp said main caliper bars to said frame in adjusted positions, auxiliary caliper bars carried by and solely connected with the outer end portions of said main caliper bars subject to extensible and angular adjustment in relation thereto, means for clamping said auxiliary caliper bars in adjusted positions, said main and auxiliary caliper bars having guide means at their outer extremities, and a removable and extensible scribing guide cable to extend over said guide means and around the templet device.

7. An adjustable templet, comprising a frame, a plurality of main caliper bars radially extending from said frame subject to extensible and angular adjustment, means to clamp said main caliper bars to said frame in adjusted positions, auxiliary caliper bars carried by the outer end portions of said main caliper bars subject to extensible and angular adjustment in relation thereto, means for clamping said auxiliary caliper bars in adjusted positions, said main and auxiliary caliper bars having guide means at their outer extremities, a scribing guide cable to extend over said guide means and around the templet device, a rotative cable reel carried by said frame, means to lock said cable reel against rotation, and means to anchor said cable in extended condition.

8. An adjustable templet, comprising a central main frame composed of cooperative sections, means connecting said frame sections for relative extensive and contractive movements, means for locking said frame sections in extended relation, a plurality of main caliper bars radially extending from said frame subject to extensible and angular adjustment, means to clamp said main caliper bars to said frame in adjusted positions, auxiliary caliper bars carried by and solely connected with the outer end portions of said main caliper bars subject to extensible and angular adjustment in relation thereto, and means for clamping said auxiliary bars in adjusted positions.

9. An adjustable templet, comprising a central main frame composed of cooperative sections, means connecting said frame sections for relative extensive and contractive movements, means for locking said frame sections in extended relation, a plurality of main caliper bars radially extending from said frame subject to extensible and angular adjustment, means to clamp said main caliper bars to said frame in adjusted positions, auxiliary caliper bars carried by and solely connected with the outer end portions of said main caliper bars subject to extensible and angular adjustment in relation thereto, means for clamping said auxiliary bars in adjusted positions, said main and auxiliary caliper bars having guide means at their outer extremities, and a removable and extensible scribing guide cable to extend over said guide means and around the templet device.

10. An adjustable templet, comprising a frame composed of cooperative sections, means connecting said frame sections for relative extensive and contractive movements, means for locking said frame sections in extended relation, a plurality of main caliper bars radially extending from said frame subject to extensible and angular adjustment, means to clamp said main caliper bars to said frame in adjusted positions, auxiliary caliper bars carried by the outer end portions of said main caliper bars subject to extensible and angular adjustment in relation thereto, means for clamping said auxiliary bars in adjusted positions, said main and auxiliary caliper bars having guide means at their outer extremities, a scribing guide cable to extend over said guide means and around the templet device, a rotative cable reel carried by said frame, means to lock said cable reel against rotation, and means to anchor said cable in extended condition.

FREDERICK REICH.